United States Patent [19]

Dynesen

[11] 4,259,568
[45] Mar. 31, 1981

[54] COMBINED CASING AND OPERATIONAL SUPPORT FOR A POCKET CALCULATOR

[75] Inventor: Henning Dynesen, Egå, Denmark

[73] Assignee: Henning Dynesen A/S, Egå, Denmark

[21] Appl. No.: 84,449

[22] Filed: Oct. 12, 1979

[51] Int. Cl.³ .................................................. G06C 5/02
[52] U.S. Cl. ................................. 235/1 D; 150/52 R; 206/305; 248/676
[58] Field of Search ........................... 235/1 D, 61 R; 150/52 R; 206/45.21, 45.22, 45.23, 305, 316; 248/459, 664, 676; 402/72; 220/339; 312/140.1, 140.2, 140.3, 140.4

[56] References Cited

U.S. PATENT DOCUMENTS

| | | | |
|---|---|---|---|
| 3,923,152 | 12/1975 | Minneman | 220/339 |
| 4,044,980 | 8/1977 | Cummins | 248/676 |
| 4,071,065 | 1/1978 | Halbich | 206/305 |
| 4,165,554 | 8/1979 | Faget | 235/1 D |
| 4,184,594 | 1/1980 | Hehn | 220/339 |

*Primary Examiner*—L. T. Hix
*Assistant Examiner*—Benjamin R. Fuller
*Attorney, Agent, or Firm*—Bacon & Thomas

[57] ABSTRACT

A combined casing and operational support for a pocket calculator, comprising a rectangular bottom and a rectangular cover connected with the bottom through a hinge joint and including a first part close to the hinge joint, and a second part having a greater length than the first part and being connected therewith through a further hinge joint. By turning the two parts of the cover in the same direction in the two hinge joints, the casing may be brought into a raised operative position, in which the first part of the cover projects below the bottom, whereas the side of the second part of the cover opposite said further hinge joint is connected with the bottom by mutually cooperating interlocking means comprising a pin on the cover part and a cut-out in the bottom.

18 Claims, 9 Drawing Figures

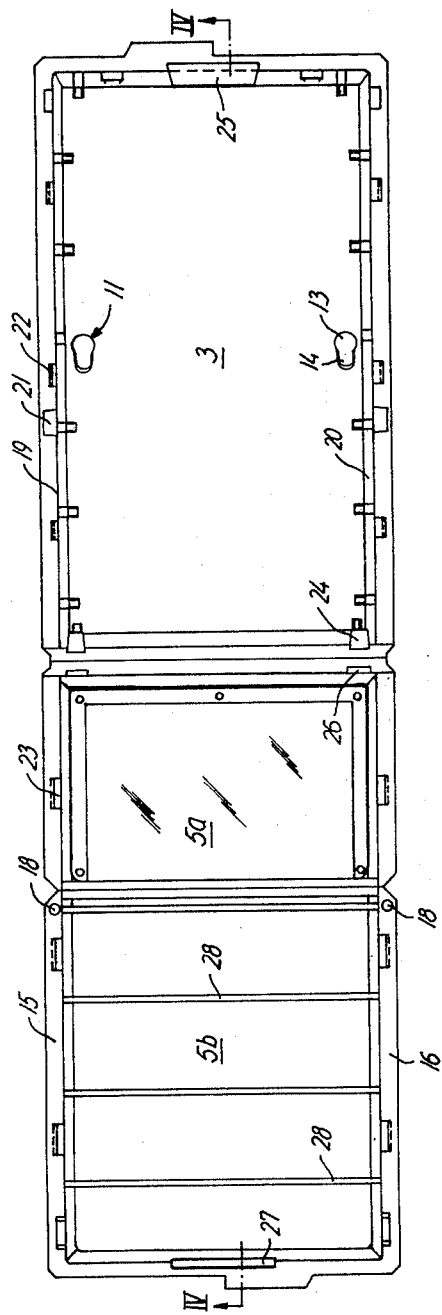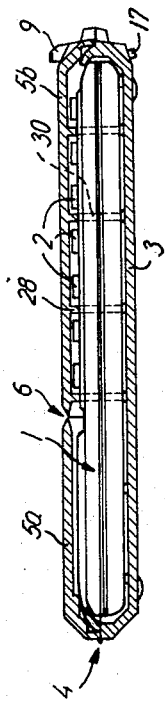
FIG. 3
FIG. 5

COMBINED CASING AND OPERATIONAL SUPPORT FOR A POCKET CALCULATOR

BACKGROUND OF THE INVENTION

The present invention relates to a casing for a pocket calculator or a similar apparatus having a visual display, said casing comprising a rectangular bottom and a rectangular cover suitable for the size of said pocket calculator and having raised side walls so as to enclose the pocket calculator completely in a closed condition of the casing, said bottom and said cover being connected through a hinge joint at one of their shorter sides.

Known casings for pocket calculators do normally not offer any particularly good protection against mechanical damage resulting from impact or shock, since they are manufactured from leather or a similar material with a relatively small thickness. In many cases the calculator must be removed from the casing when it is to be used.

However, for pocket calculators of a relatively small thickness, casings are known, normally formed as pocket calendars, in which the calculator remains stationary during use. However, in use such casings must be kept in an open condition, in which they take up a space corresponding to twice the size of the calculator.

SUMMARY OF THE INVENTION

The object of the invention is to provide a casing which in a closed condition offers a good protection against mechanical damage, the casing functioning simultaneously as an oblique operational support for the pocket calculator without taking up substantially more space in the longitudinal as well as the transverse direction than the pocket calculator itself, whereby the pocket calculator will be positioned in the most advantageous observation angle for the user with respect to reading of the visual display, so that the disadvantage occurring particularly for pocket calculators having a display of the LCD-type, that reading is only possible within a very narrow angular range requiring the calculator to be positioned directly in front of the user, is remedied.

According to the invention, a casing for a pocket calculator or a similar apparatus having a visual display is provided, which comprises a rectangular bottom and a rectangular cover suitable for the size of said pocket calculator and having raised side walls so as to enclose the pocket calculator completely in a closed condition of the casing, said bottom and said cover being connected through a hinge joint at one of their shorter sides, said cover comprising a first part located close to said hinge joint, and a second part having a greater length than the first part and being connected therewith through a further hinge joint, the axis of which is parallel to that of the first-mentioned hinge joint, the side walls of the cover and the bottom extending along said one short side being oblique and allowing the cover to be turned to an extreme position in which the cover projects below the bottom, said further hinge joint allowing the second cover part to be turned relative to the first cover part in the same direction as the turning of the first cover part relative to the bottom allowed by the first-mentioned hinge joint, mutually co-operating interlocking means being provided at the shorter side of the upper side of the cover opposite the first-mentioned hinge joint and in the underside of the bottom for securing the second cover part relative to the bottom after turning of the two cover parts in said hinge joints.

In a preferred embodiment, the casing is designed with the bottom and the two cover parts made integrally from a moulded plastic and with a reduced wall thickness at said hinge joints relative to other parts of the bottom and the cover.

An excellent protection against mechanical damage, whereby the casing will be substantially non-compressible in a closed condition, may be obtained by forming reinforcing ribs on the underside of the second cover part parallel to the shorter side thereof, said ribs having a height so as to project in the closed condition of the casing down between the keyrows of a pocket calculator arranged in the casing.

BRIEF DESCRIPTION OF THE DRAWINGS

In the following, further details and advantages of the casing according to the invention will be explained with reference to the accompanying drawings, in which:

FIGS. 2 and 3 are plan views of the casing in FIG. 1 shown from the external and the internal side, respectively, FIGS. 4 and 5 are longitudinal sectional views of the casing in an open and a closed condition, respectively.

DETAILED DESCRIPTION

Figure 1:
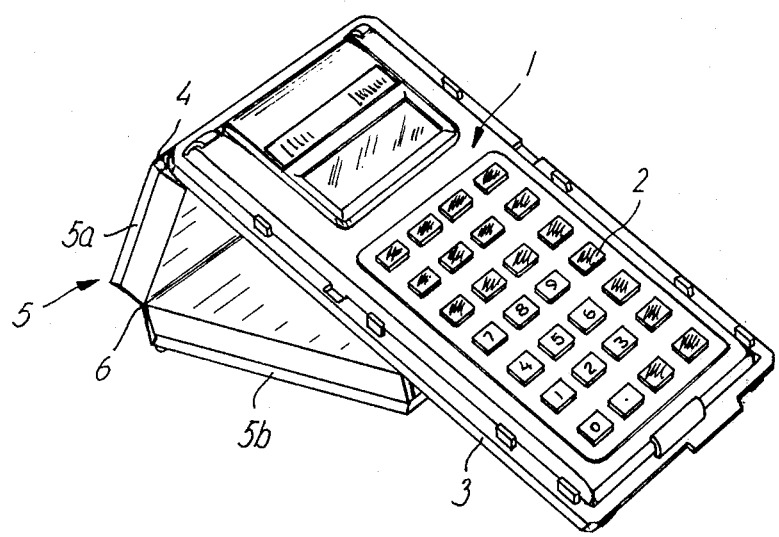
FIG. 1 is a perspective view of an embodiment of a casing according to the invention shown in an upright position as an operational support for a pocket calculator.

In FIG. 1, a pocket calculator 1 is shown having digital and functional keys 2 arranged in a matrix configuration of rows and columns and positioned in an embodiment of a combined casing and operational support according to the invention. The casing which in the figure is shown in a raised position for use as an operational support comprises a rectangular bottom 3 which is connected at one of the shorter sides through a hinge joint 4 with a cover 5 which according to the invention comprises a first part 5a close to the hinge joint 4, and a second part 5b having a greater length than part 5a and being connected therewith through a further hinge joint 6, the axis of which is parallel to that of the hinge joint 4.

Figure 2:
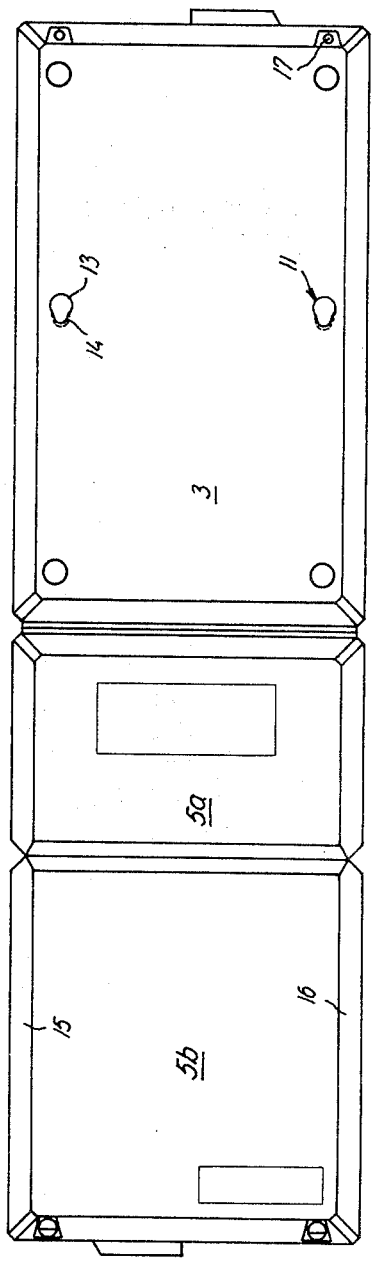

As shown in the plane views in FIGS. 2 and 3 and the longitudinal sectional views of the casing in an open condition, the bottom 3 and the bipartite cover 5 has raised side walls which in a closed condition of the casing completely encloses the pocket calculator 1 arranged therein.

As most clearly illustrated in the sectional view in FIG. 4, the shorter side walls 7 and 8, respectively, of the cover 5 and the bottom 3 positioned at the hinge joint 4 are oblique, so as to allow turning of the cover in the hinge joint 4 to an extreme position, as shown in FIG. 1, in which the cover projects below the bottom 3. Said side walls may form an angle of 40°, for example, with the vertical, so that the first part 5a of the cover will form an angle of about 100° with the bottom 3 in said extreme position. Simultaneously, the further hinge joint 6 is constructed so as to allow turning of the second part 5b of the cover relative to the first part 5a in the same direction as the turning of part 5a relative to the bottom 3 allowed by the hinge joint 4, i.e. counter-clockwise from the position shown in the sectional view in FIG. 4, so that the second part 5b of the cover after such a turning assumes the position shown in FIG. 1 with the shorter side opposite the hinge joint 6 moved into engagement with the underside of the bottom 3.

According to the invention, mutually co-operating interlocking means are formed at said shorter side of the second part 5b of the cover and in the underside of the bottom 3 for securing the second cover part 5b to the bottom 3 after turning to the position shown in FIG. 1. As shown in FIGS. 2 to 4, these interlocking means comprise a pin 9 formed on the upper side of the short oblique side wall 10 of the cover part 5b opposite the hinge joint 6, said side wall forming an angle with the plane of the cover of the same size as that of the opposite side wall 7, and a cut-out 11 formed in the bottom 3 for close fit with the pin 9.

Figure 6:
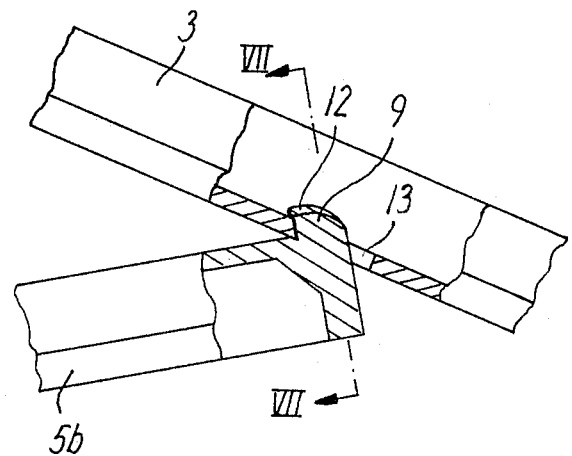
FIG. 6 is a longitudinal sectional view of a part of the casing in the position shown in FIG. 1.
Figure 7:
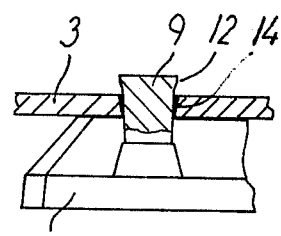
FIG. 7 is a cross-sectional view along the line VII—VII in FIG. 6, and FIGS. 8 and 9 show details of the sectional view in FIG. 4 at a larger scale.

The construction of and the functional co-operation between the pin 9 and the cut-out 11 will most clearly appear from the sectional views in FIGS. 6 and 7. The pin 9 has a mainly circular cross-section, but is formed in its free end with projecting edge portions 12 giving the pin a somewhat increased width. The cut-out 11 has the form of a keyhole comprising a circular portion 13 of a diameter greater than that of the pin 9, and a narrow extension 14 directed towards the hinge joint 4. As shown in FIGS. 2 and 3, the extension 14 is wedge-shaped with a width decreasing from the circular portion 13. As shown in FIG. 7, the walls of the extension 14 are furthermore oblique relative to the plane of the bottom 3 in such a direction that the width of the extension 14 is a little greater at the upper side of the bottom relative to the underside thereof. The cut-out 14 is positioned in the bottom 3, so that the separation of the circular portion 13 from the hinge joint 4 is a little greater than the separation of the pin 9 from said hinge joint when the cover with cover parts 5a and 5b has been turned to the extreme position shown in FIGS. 1 and 6 with the pin 9 moved into engagement with the underside of the bottom 3.

As shown in FIGS. 2 and 3, there is provided in the illustrated embodiment two pairs of co-operating interlocking means positioned opposite each other at the longitudinal sides of the casing, and each comprising a pin 9 and a cut-out 11.

As the casing as a whole is formed with the bottom 3 and the two parts 5a and 5b of the cover 5 made integrally from a moulded plastic with a reduced wall thickness at the hinge joints 4 and 6 relative to the other parts of the bottom and the cover, a very saft and reliable connection of the cover part 5b to the bottom 3 is obtained in the position shown in FIG. 1 with a construction of interlocking means as shown and described. When the pin 9 has been moved into engagement with the underside of the bottom 3, it will be positioned at the side of the cut-out 11 facing the hinge joint 4, so that a slight pull in the direction away from the hinge joint 4 will be required for introducing the pin in the circular portion 13 of the cut-out. When the pin 9 has been introduced in the circular portion 13 of the cut-out, it will be drawn into the wedge-shaped extension 14 of the cut-out in the direction towards the hinge joint 4 due to the spring function of hinge joints 4 and 6 and the elastic resiliency in the moulded plastic in the cover part 5a. Thereby, due to the wedge-shape of the extension 14, a clamping of the pin 9 occurs, and simultaneously the edge portions 12 of the pin 9 projecting in the width direction function as a head preventing the pin from being drawn out through the extension 14, whereby in order to remove the pin 9 from the cut-out 11, a new pull in the direction away from the hinge joint 4 will be required so as to allow the pin 9 to pass through the circular portion 13.

Figure 4:
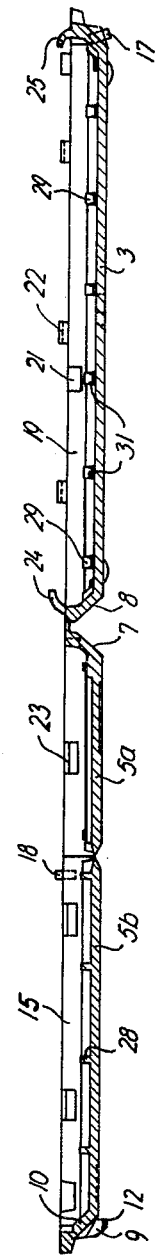

Since, as mentioned, the casing incorporating the bottom 3 and the cover parts 5a and 5b is made in one piece from a moulded plastic and may, thereby, have a relatively smooth surface, it may be advantageous in order to obtain a greater friction when positioning the casing on a table in the position shown in FIG. 1 that supporting feet 17 and 18, respectively, of a friction material, such as a rubber-elastic material, are provided, as shown in FIGS. 4 and 5, at the short side of the bottom 3 opposite the hinge joint 4 and on the raised side walls 15 and 16 of the cover part 5b. In the raised side walls 19 and 20 of the bottom 3, cut-outs 21 may be formed to accommodate the supporting feet 18 on the second cover part 5b in the closed condition of the casing.

In order to close the casing in the position shown in FIG. 5, mutually interlocking snap-locking means may be formed, as shown in FIGS. 2 to 4, at the opposing engaging surfaces of the raised side walls 15, 16 and 19, 20, respectively, of the cover 5 and the bottom 3, said snap-locking means comprising in the illustrated embodiment resilient tongues 22 on the walls 19 and 20 of the bottom 3 and cut-outs 23 in the side walls 15 and 16 of the cover 5. On the upper surfaces of the short side walls of the bottom 3, holding means for the calculator are provided in the form of resilient tongues 24 and 25, which in the closed condition of the casing are accommodated in cut-outs 26 and 27, respectively, in the opposed side walls of the cover 5.

In addition to the function as a raised operational support in the position shown in FIG. 1, the casing according to the invention offers in the embodiment shown an essentially improved protection of a pocket calculator against mechanical damage relative to known casings. As shown in FIGS. 3 to 5, there may be formed for this purpose reinforcing ribs 28 extending on the underside of the cover part 5b parallel to the short sides of the rectangular cover part and having a height and position so as to project down between the rows of digital and functional keys of the pocket calculator 1 to engage the upper side of the housing of the calculator in the closed condition of the casing shown in FIG. 5. Furthermore, on the upper side of the bottom 3, there may be formed along the raised side walls 19 and 20 abutment means for the bottom of the pocket calculator 1, said abutment means having the form of separate distinct raised protrusions 29, which in the closed condition of the casing shown in FIG. 5 are positioned opposite the reinforcing ribs 28. Since pocket calculators are usually constructed with reinforcing ribs extending between the key rows and ranging from the upper side to the underside of the calculator housing, as shown in dashed lines at 30 in FIG. 5, the construction with reinforcing ribs 28 and bottom abutment means 29 together with the reinforcing ribs in the pocket calculator will make the casing substantially non-compressible in a closed condition even when loaded by a relatively great mechanical force. By constructing the separate distinct bottom abutment protrusions 29 with resilient raised edge portions 31 on the upper side, a shockabsorbing function is furthermore obtained, whereby a further improved protection against mechanical damage is offered.

Figure 8:
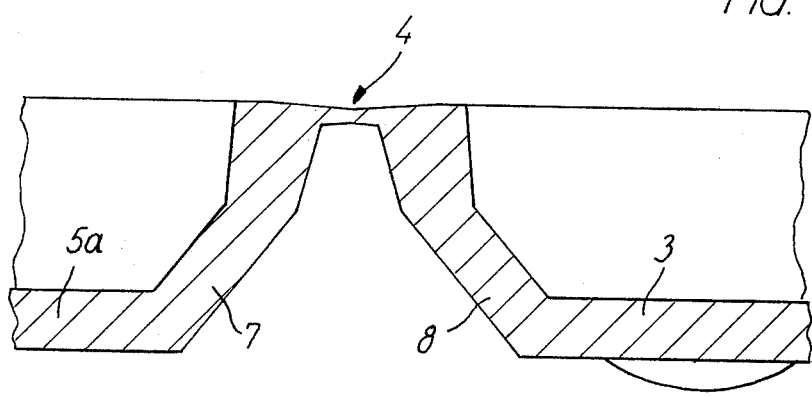
Figure 9:
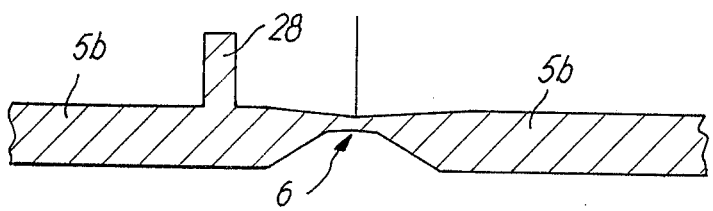

A suitable plastic for construction of the casing with the bottom 3 and the cover parts 5a and 5b in one piece by moulding may be a polypropylene copolymer, which has appeared to allow the construction shown in the drawings with a considerably reduced wall thickness at the hinge joints 4 and 6 relative to the other parts of the bottom 3 and the cover 5 simultaneously with a fully sufficient strength of the hinge joint. Preferably, the construction should be such that the wall thickness at the hinge joints 4 and 6 is smaller than 25 percent of the wall thickness in the other parts of the bottom and the cover, and with the above mentioned material it has appeared that a further reduced wall wall thickness may be allowed without any complications in use of the casing. As shown in the enlarged detailed views in FIGS. 8 and 9, the wall thickness at the hinge joints 4 and 6 may thus be reduced to about 15 percent of the wall thickness in the other parts of the bottom and the cover, the wall thickness of the hinge joints being, for example, 0.3 mms relative to a wall thickness of 2 mms in said other parts. When manufacturing the casing by moulding of a plastic, this strongly reduced wall thickness at the hinge joints 4 and 6 may be obtained by initially moulding the casing with a somewhat greater wall thickness at the hinge joints, after which a thickness reduction may be obtained by a subsequent heat treatment which simultaneously increases the width and strength of the hinge joints. Thereby, the hinge joint may resist the relatively great angle, through which the cover must be turned to reach the operative position shown in FIG. 1, as well as the additional tension produced by the pulling force necessary to obtain engagement of the interlocking means as described in the foregoing.

Although a casing for a pocket calculator has been described in the foregoing as an example of application, a casing of the kind described may also be used for similar apparatus desired to be positioned in an oblique position relative to a horizontal support, such as a table, when being used. However, the casing according to the invention is particularly suitable for devices, which in the same manner as pocket calculators comprise a visual display for alpha-numerical characters, particularly a display of the LCD-type, for which reading with good visibility may only take place within a narrow angle of observation.

What is claimed is:

1. A casing for a pocket calculator or a similar apparatus having a visual display, said casing comprising a rectangular bottom and a rectangular cover suitable for the size of said pocket calculator and having raised side walls so as to enclose the pocket calculator completely in a closed condition of the casing, said bottom and said cover being connected through a hinge joint at one of their shorter sides, said cover comprising a first part located close to said hinge joint, and a second part having a greater length than the first part and being connected therewith through a further hinge joint, the axis of which is parallel to that of the first-mentioned hinge joint, the side walls of the cover and the bottom extending along said one short side being oblique and allowing the cover to be turned to an extreme position in which the cover projects below the bottom, said further hinge joint allowing the second cover part to be turned relative to the first cover part in the same direction as the turning of the first cover part relative to the bottom allowed by the first-mentioned hinge joint, mutually co-operating interlocking means being provided at the shorter side of the upper side of the cover opposite the first-mentioned hinge joint and in the underside of the bottom for securing the second cover part relative to the bottom after turning of the two cover parts in said hinge joints.

2. A casing as claimed in claim 1, wherein the bottom and the two cover parts are made integrally from a moulded plastic and with a reduced wall thickness at said hinge joints relative to other parts of the bottom and the cover.

3. A casing as claimed in claim 2, wherein said plastic is a polypropylene copolymere.

4. A casing as claimed in claim 2, wherein said reduced wall thickness is smaller than 25 percent of the wall thickness of said other parts of the bottom and the cover.

5. A casing as claimed in claim 2, wherein said interlocking means comprise a protruding pin and a cut-out designed for close fit with said pin.

6. A casing as claimed in claim 5, wherein the pin has a circular cross-section, and the cut-out has the form of a keyhole comprising a circular portion of a diameter greater than that of the pin, and a narrow extension having a width adapted to the diameter of the pin.

7. A casing as claimed in claim 6, wherein the pin is formed on the second cover part, and the cut-out in the bottom.

8. A casing as claimed in claim 7, wherein said extension is directed from the circular portion of the cut-out towards the first-mentioned hinge joint, and the separation of said circular portion from said hinge joint is a little greater than the separation of pin from the hinge joint when the cover has been turned at the first-mentioned hinge joint to said extreme position, and the pin has been moved to engage the bottom by turning in said further hinge joint.

9. A casing as claimed in claim 6, wherein the extension of the cut-out is wedge-shaped with a width decreasing from the circular portion.

10. A casing as claimed in claim 8, wherein the pin has an increased width in its free end, and the walls of the extension of the cut-out are oblique relative to the plane of the bottom, whereby the width of said extension is a little greater at the upper side of the bottom relative to the underside thereof.

11. A casing as claimed in claim 1, wherein supporting feet of a friction material are provided at the shorter side of the bottom opposite the first-mentioned hinge joint and on the raised side walls of the second cover part close to said further hinge joint, cut-outs being formed in the raised side walls of the bottom to accommodate the supporting feet on the second cover part in the closed condition of the casing.

12. A casing as claimed in claim 11, wherein said supporting feet are of a rubber-elastic material.

13. A casing as claimed in claim 1, wherein snap-locking means are provided at the engaging opposed surfaces of the raised side walls of the cover and the bottom.

14. A casing as claimed in claim 13, wherein said snap-locking means comprise resilient tongues at one engaging surface and corresponding cut-outs in the other engaging surface.

15. A casing as claimed in claim 1, wherein reinforcing ribs are formed on the underside of the second cover part parallel to the shorter side thereof, said ribs having a height so as to project in the closed condition of the casing down between the keyrows of a pocket calculator arranged in the casing.

16. A casing as claimed in claim 1, wherein abutment means are provided on the upper side of the bottom to support the bottom of a calculator arranged in the casing.

17. A casing as claimed in claim 15, wherein abutment means in the form of separate distinct protrusions are formed at the bottom opposite said reinforcing ribs to support the bottom of a calculator arranged in the casing.

18. A casing as claimed in claim 17, wherein raised resilient edge portions are formed at the upper side of said protrusions.

* * * * *